US009389297B2

(12) United States Patent
Zohar et al.

(10) Patent No.: US 9,389,297 B2
(45) Date of Patent: Jul. 12, 2016

(54) SYSTEM AND METHOD FOR LOCATING ITEMS AND PLACES

(76) Inventors: Avi Zohar, Rosh Haain (IL); Sharon Zohar, San Jose, CA (US)

(*) Notice: Subject to any disclaimer, the term of this patent is extended or adjusted under 35 U.S.C. 154(b) by 150 days.

(21) Appl. No.: 12/407,219

(22) Filed: Mar. 19, 2009

(65) Prior Publication Data

US 2009/0251363 A1 Oct. 8, 2009

Related U.S. Application Data

(60) Provisional application No. 61/070,198, filed on Mar. 19, 2008.

(51) Int. Cl.
| | |
|---|---|
| *G01S 5/04* | (2006.01) |
| *G01S 3/52* | (2006.01) |
| *G01S 3/54* | (2006.01) |
| *G01S 5/02* | (2010.01) |
| *G01S 3/46* | (2006.01) |

(52) U.S. Cl.
CPC ...... *G01S 3/52* (2013.01); *G01S 3/54* (2013.01); *G01S 5/02* (2013.01); *G01S 3/46* (2013.01); *G01S 5/04* (2013.01)

(58) Field of Classification Search
CPC ............... G01S 3/74; G01S 5/04; G01S 3/46; G01S 3/52; G01S 3/54; G01S 5/02
USPC ........................................................ 342/443
See application file for complete search history.

(56) References Cited

U.S. PATENT DOCUMENTS

| | | | | |
|---|---|---|---|---|
| 4,636,796 | A | * | 1/1987 | Imazeki .................... 342/443 |
| 4,800,541 | A | * | 1/1989 | Farmer et al. .............. 367/124 |
| 5,093,649 | A | | 3/1992 | Johnson |
| 5,173,709 | A | * | 12/1992 | Lauro et al. ................ 342/443 |
| 5,214,436 | A | | 5/1993 | Hannan |
| 5,266,958 | A | * | 11/1993 | Durboraw, III ......... 342/357.31 |
| 5,361,072 | A | | 11/1994 | Barrick et al. |
| 5,381,444 | A | | 1/1995 | Tajima |
| 5,610,612 | A | * | 3/1997 | Piper ............................ 342/195 |

(Continued)

FOREIGN PATENT DOCUMENTS

WO WO2007/123487 * 11/2007

OTHER PUBLICATIONS

KR2008002992 (Derwent), Jul. 2008, Korea, Lee, G.W.*

(Continued)

*Primary Examiner* — Frank J McGue
(74) *Attorney, Agent, or Firm* — Haverstock & Owens LLP (57) ABSTRACT

A locator includes a base unit and a handheld unit. The base unit, which is typically stationary, includes an FSK transceiver and printed circuit antennas. The handheld unit, which is typically mobile, also includes an FSK transceiver and printed circuit antennas. The handheld unit computes at least one bearing to the base unit over multiple frequencies and transmitting antennas, processes statistics of bearing results, determines a cyclic average of the bearing results, calculates an overall variance, assesses quality of a computed bearing result based on the overall variance, and upon assessing, either displays the computed bearing result or disqualifies the computed bearing. The handheld unit computes a height difference between the base unit and the handheld unit. The height difference is calculated using altimeters within the units. Alternatively, the height difference is calculated using GPS.

22 Claims, 9 Drawing Sheets

(56) References Cited

U.S. PATENT DOCUMENTS

| | | | |
|---|---|---|---|
| 5,689,274 A | 11/1997 | Rose | |
| 5,715,530 A | 2/1998 | Eul | |
| 5,722,064 A * | 2/1998 | Campana, Jr. | 455/351 |
| 5,724,047 A * | 3/1998 | Lioio et al. | 342/442 |
| 5,945,947 A | 8/1999 | Cunningham | |
| 5,982,322 A | 11/1999 | Bickley et al. | |
| 6,307,380 B1 | 10/2001 | Hirai et al. | |
| 6,459,415 B1 | 10/2002 | Pachal et al. | |
| 6,529,142 B2 | 3/2003 | Yeh et al. | |
| 6,556,942 B1 | 4/2003 | Smith | |
| 6,573,683 B2 * | 6/2003 | Chang | 320/107 |
| 6,812,824 B1 | 11/2004 | Goldinger et al. | |
| 7,289,425 B2 | 10/2007 | Yeh et al. | |
| 7,379,015 B2 | 5/2008 | Workman | |
| 7,409,226 B1 * | 8/2008 | Stevenson | 455/562.1 |
| 7,428,450 B1 * | 9/2008 | Oberg | 701/4 |
| 7,595,755 B2 | 9/2009 | Newton et al. | |
| 7,917,155 B2 * | 3/2011 | Karr et al. | 455/456.1 |
| 8,054,225 B2 * | 11/2011 | Sim et al. | 342/432 |
| 8,125,372 B2 | 2/2012 | Focke et al. | |
| 2002/0089445 A1 * | 7/2002 | Odashima et al. | 342/357.08 |
| 2003/0141973 A1 | 7/2003 | Yeh et al. | |
| 2005/0259568 A1 | 11/2005 | Yeh et al. | |
| 2006/0088042 A1 * | 4/2006 | Shoham et al. | 370/401 |
| 2006/0148423 A1 * | 7/2006 | Sharpe | 455/90.1 |
| 2008/0102859 A1 * | 5/2008 | Karr et al. | 455/456.3 |
| 2008/0309765 A1 * | 12/2008 | Dayan et al. | 348/158 |
| 2009/0085796 A1 | 4/2009 | Kuroda et al. | |
| 2009/0289844 A1 * | 11/2009 | Palsgrove et al. | 342/357.07 |
| 2010/0033365 A1 | 2/2010 | Kishida et al. | |
| 2010/0109933 A1 | 5/2010 | Rhodes et al. | |
| 2010/0151886 A1 | 6/2010 | Swope et al. | |
| 2010/0207820 A1 | 8/2010 | Kawano et al. | |
| 2010/0234044 A1 | 9/2010 | Lohbihler | |

OTHER PUBLICATIONS

Phillips et al., "A New Excitation Method: Combining Burst Random Excitation with Cyclic Averaging", IMAC, 1996.*
Phillips et al., "Frequency Resolution Effects on FRF Estimation: Cyclic Averaging vs. Large Block Size", IMAC 1999.*
Louis E. Frenzel, "Printed-Circuit-Board Antennas", Electronic Design, Mar. 2005.*
Stelzer et al., "Precise Distance Measurement with Cooperative FMCW Radar Units", 2008 IEEE Radio and Wireless Symposium Jan. 22-24, 2008. pp. 771-774.

* cited by examiner

SYSTEM AND METHOD FOR LOCATING ITEMS AND PLACES

RELATED APPLICATIONS

The application claims priority of U.S. provisional application Ser. No. 61/070,198, filed Mar. 19, 2008, and entitled "Car Locator," by the same inventors. This application incorporates U.S. provisional application Ser. No. 61/070,198, in its entirety by reference.

FIELD OF THE INVENTION

The present invention is related to a locator. More particularly, the present invention is related to a system and method for locating items and places.

BACKGROUND OF THE INVENTION

Existing technologies allow users to find a location but often do not function correctly under certain circumstances. For example, GPS based systems rely on microwave signals transmitted by Medium Earth Orbit satellites; such microwave signals are affected by multipath propagation and atmospheric conditions. Effects of multipath propagation include data corruption, signal nulling, increased signal amplitude and decreased signal amplitude. Since acquiring and tracking such signals can therefore be difficult or impossible, particularly when used indoors, GPS-based systems may become increasingly inaccurate or stop working. Similarly, radio signals of Doppler effect based DF systems, for example, are also affected by the multipath phenomenon. Furthermore, handheld locators of existing technologies use whip antennas. The whip antennas are mounted at highest points of the handheld locators in order to provide a clear, unobstructed view of the horizon in all directions. As such, the size increase and shape oddity of the handheld locators make the handheld locators impractical for carrying in pockets and purses or on key chains.

SUMMARY OF THE INVENTION

A system for locating items and places includes a base unit and a handheld unit. The base unit includes a first transceiver and a first set of printed circuit antennas. The handheld unit includes a second transceiver, a second set of printed circuit antennas, and a mechanism to calculate bearing to the base unit and to display the bearing on the handheld unit. In some embodiments, each of the first set of printed circuit antennas and the second set of printed circuit antennas is an array of omni-directional antennas. In some embodiments, each of the first transceiver and the second transceiver is an FSK transceiver. The base unit sends a beacon signal used by the second transceiver to calculate a bearing. Doppler effect based measurements are used to calculate the bearing. The bearing is a cyclic average of bearing results. The bearing is computed over multiple transmitted carrier frequencies and transmitting antennas. In some embodiments, the base unit further includes at least one of a cigarette lighter plug and an outlet plug. In some embodiments, the base unit further includes a socket splitter. In some embodiments, the base unit is configured to swivel about a portion of a power connector of the base unit. In some embodiments, the handheld unit further includes a GPS component configured to extend an outdoor range of the handheld unit, wherein the handheld unit is able to operate without the GPS component. In some embodiments, the handheld unit is able to at least one of visually and audibly present directional information to a user. In some embodiments, the directional information includes a graphical arrow which is graphically filled proportionally to a received power as an indication of a distance between the handheld unit and the base unit. In some embodiments, the handheld unit is a stand alone device, an add-on to or is integrated with an electronic device.

A method of using a locator includes transmitting a first set of information from a first unit to a second unit by using a narrow band transmission protocol, receiving the first unit transmission at the second unit, transmitting a second set of information from the second unit to the first unit upon a first ID match, receiving the second unit transmission at the first unit, and presenting data at the first unit to a user upon a second ID match, the data comprising directional information to the second unit. In some embodiments, the second set of information is periodically transmitted. Transmissions are FSK modulated and demodulated. In some embodiments, the data further includes a graphical arrow which is graphically filled proportionally to a received power as an indication of a distance between the first unit and the second unit. In some embodiments, the data further includes a bearing computed by the second unit. The bearing is calculated using Doppler effect based measurements. The bearing is a cyclic average of bearing results. The bearing is computed over multiple transmitted carrier frequencies and transmitting antennas. In some embodiments, the data further includes a beacon signal and the second unit computes the bearing. In some embodiments, the data further includes a calculated height difference between the first unit and the second unit. The calculated height difference is based on GPS or is based on a pressure difference between the first unit and the second unit. In some embodiments, the presenting includes the first unit beeping at a beep rate proportional to a received power as an indication of a distance between the first unit and the second unit, or displaying a graphical display that is proportional to the distance, for example, the filling of the graphic arrow. In some embodiments, the presenting includes presenting different sounds for different information. In some embodiments, the first unit is a handheld locator unit having a first set of planar antennas, and the second unit is the base locator unit having a second set of planar antennas.

A method of overcoming multipath effects includes computing at least one bearing to a first unit over multiple frequencies and transmitting antennas, processing statistics of bearing results, determining a cyclic average of the bearing results, calculating an overall variance, assessing quality of a computed bearing result based on the overall variance, and upon assessing, either displaying the computed bearing result on a second unit or disqualifying the computed bearing. In some embodiments, a bearing result deviating from the cyclic average by a predetermined amount is removed before determining the cyclic average. In some embodiments, the first unit is a base unit and the second unit is a handheld unit, wherein the base unit and the second unit are used to locate items and places. In some embodiments, each of the first unit and the second unit includes a set of planar antennas. In some embodiments, each of the first unit and the second unit includes an FSK transceiver.

A handheld unit includes an FSK transceiver, a set of printed circuit antennas, and a feedback module configured to provide directional information from the handheld unit to reference point. In some embodiments, the set of printed circuit antennas is an array of omni-directional antennas. The directional information is audibly presented, visually presented, or both. The directional information includes a bearing computed over multiple transmitted carrier frequencies and transmitting antennas. The handheld unit includes an altimeter, a antenna switching circuitry, a display, a keypad, and speakers. In some embodiments, the handheld unit further includes a GPS component configured to extend an outdoor range of the handheld unit, wherein the handheld unit is able to operate without the GPS component. The GPS component is configured to calculate location and a height difference between the handheld unit and the reference point.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein or with equivalent alternatives.

Reference will now be made in detail to implementations of the present invention as illustrated in the accompanying drawings. The same reference indicators will be used throughout the drawings and the following detailed description to refer to the same or like parts.

Introduction

Doppler effect is the change in wavelength as a transmitter and a receiver move toward or away from each other. For example, an emergency vehicle siren appears higher in pitch when the emergency vehicle (e.g. transmitter) is approaching an observer (e.g. receiver), and lower in pitch when the emergency vehicle is traveling away from the observer.

Figure 4:
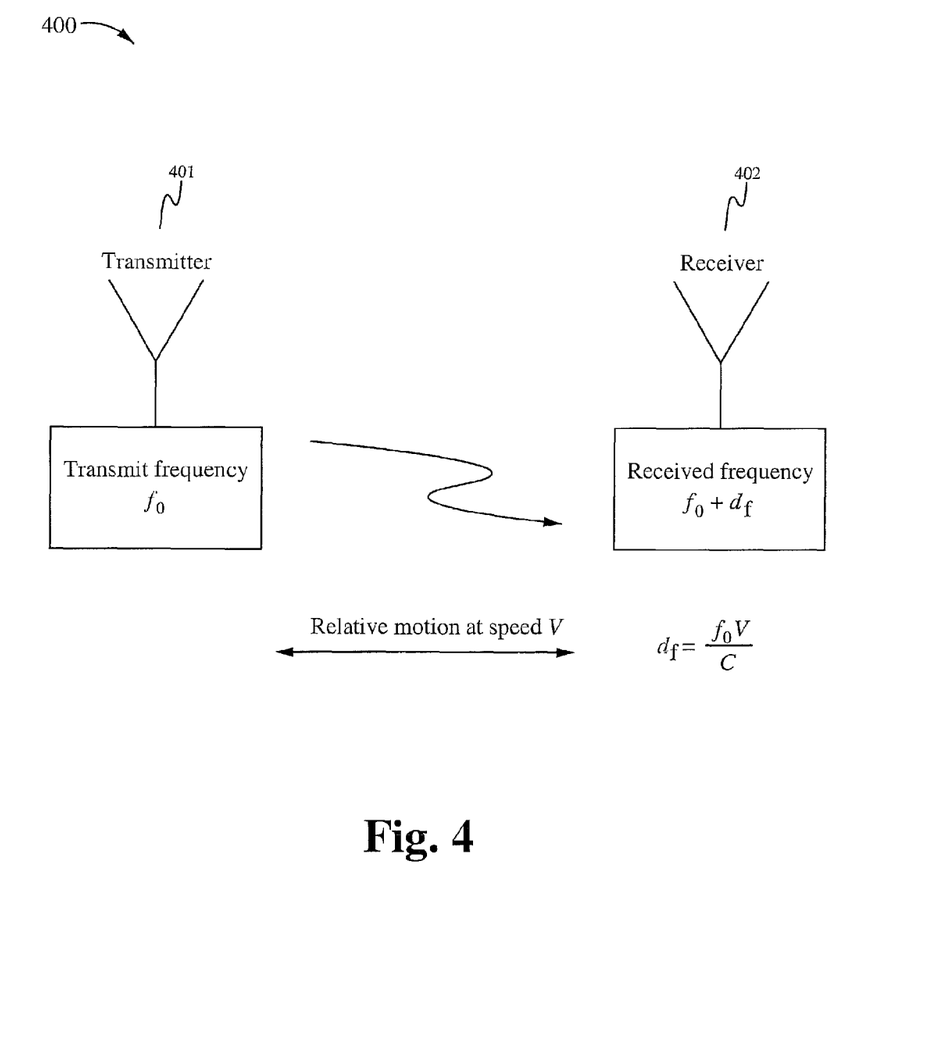
FIG. 4 illustrates a Doppler effect based system including a transmitter and a receiver.

FIG. 4 illustrates a Doppler effect based system 400 including a transmitter 401 and a receiver 402. Assume that the transmitter 401 is stationary and transmits in a range centered around a carrier frequency $f_0$. If a relative movement exists between the transmitter 401 and the receiver 402 at speed V, then the received signal frequency deviates from $f_0$ by $d_f$, where $d_f$ is calculated using the Doppler formula: $d_f=f_0V/C$, where C=speed of light. The frequency shift ($d_f$) is positive if the transmitter 401 and the receiver 402 are moving toward each other and is negative if the transmitter 401 and the receiver 402 are moving away from each other.

Direction finding (DF) refers to the establishment of the direction from which a received signal was transmitted. DF using the Doppler effect generates a bearing estimate on the received signal by measuring a Doppler shift produced by a single rotating antenna moving in a circle.

Figure 5:
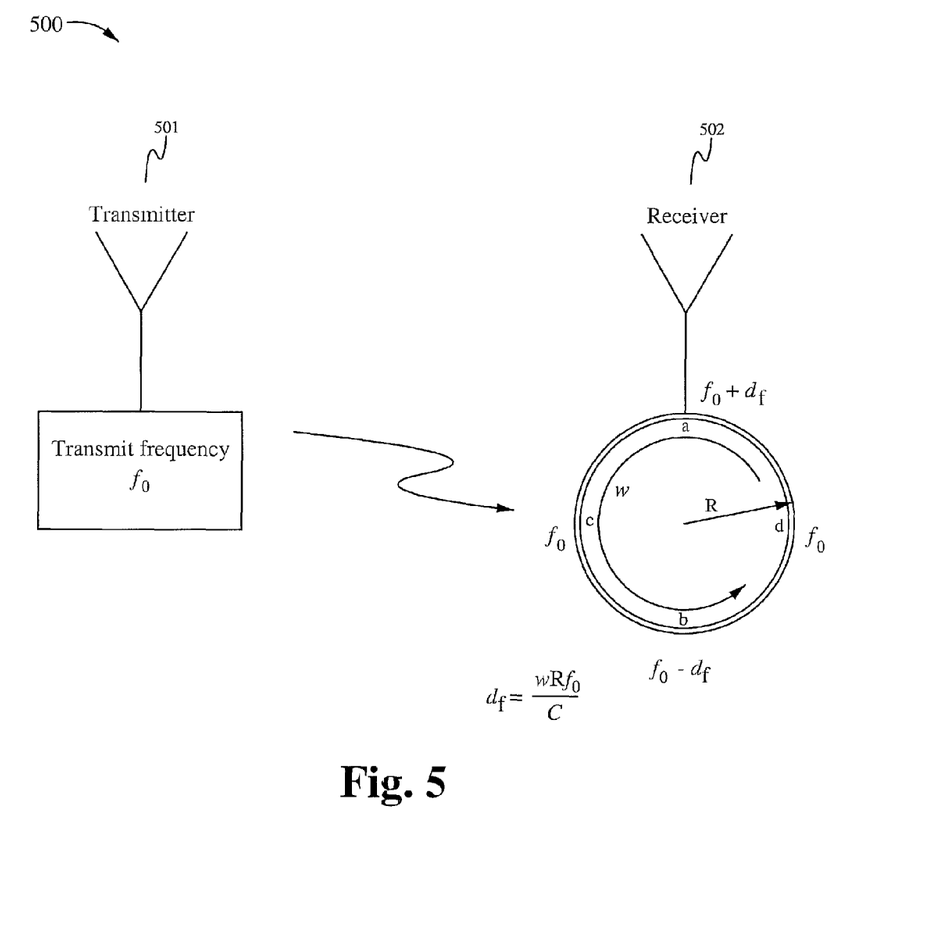
FIG. 5 illustrates a Doppler effect based DF system including a transmitter and a receiver.

FIG. 5 illustrates a Doppler effect based DF system 500 including a transmitter 501 and a receiver 502. Assume that the transmitter 501 is stationary and transmits in a range centered around a carrier frequency $f_0$. The receiver 502 is connected to a single rotating antenna. As illustrated, the rotating antenna is symbolized to be positioned at the tip of the radial vector R, a circular motion vector ω on a circle with same radius |R| and at an angular speed of ω[rad/sec]. The tangential speed of the rotating antenna towards the transmitter at point a is maximal (V=ωR) when the signal is incoming at a, resulting in $d_f=f_0\omega R/C$. The received signal frequency at point a is $f_0+d_f$. The tangential speed of the rotating antenna away from the transmitter at point b is maximal, resulting in $d_f=-f_0\omega R/C$. The received signal frequency at point b is $f_0-d_f$. At points c and d, the tangential speed towards the transmitter 501 is 0, resulting in no frequency shifts at the receiver 502. The received signal frequency at point c and point d is $f_0$.

The received signal equals a carrier signal at $f_0$ that is FM modulated by an information signal at frequency ω and at maximum frequency deviation of $d_f$. FM demodulating the received signal yields a sine wave signal at frequency ω (2 Π frequency of antenna rotation). The phase difference between the demodulated signal and the phase of rotation of the antenna is proportional to the direction of the incoming signal.

As discussed in detail below, received signals in some embodiments of the system and method for locating items and places are demodulated using an FSK demodulator instead of an FM demodulator. In addition, an array of omnidirectional antennas is used, in some embodiments, instead of a single rotating antenna.

When a radio frequency (RF) signal is transmitted from a transmitter towards a receiver, the RF signal encounters objects that reflect, refract, diffract or interfere with the signal, which causes multipath propagation. In other words, RF signals take different paths from the transmitter to the receiver. When multiple signal propagation paths exist, the received signal is the vector sum of all the signals incident from any direction or angle of arrival.

Embodiments of the system and method for locating items and places implement frequency diversity and antenna diversity to overcome the multipath effect on signal directionality, as discussed in detail below.

Locator

A locator comprises a base unit and a handheld unit. The base unit is typically stationary, e.g. positioned within a parked vehicle, and the handheld unit is typically mobile, e.g. carried by a user. In some embodiments, the handheld unit can be carried on a key chain by the user. In other embodiments, the handheld unit is integrated with a key fob.

The locator advantageously allows the user to locate an item or a place. When the user wishes to locate, for example, the parked vehicle, the user presses a key on the handheld unit. Information is displayed on the handheld unit to help the user locate the parked vehicle. In some embodiments, the received signal power is graphically and audibly presented. In some embodiments, an arrow pointing in the direction of the vehicle appears on the display of the handheld unit. In some embodiments, the graphical indication also guides the user up or down for use in multi-floor parking garages or buildings. In some embodiments, the received signal power also serves as a vicinity indication.

Figure 1A:
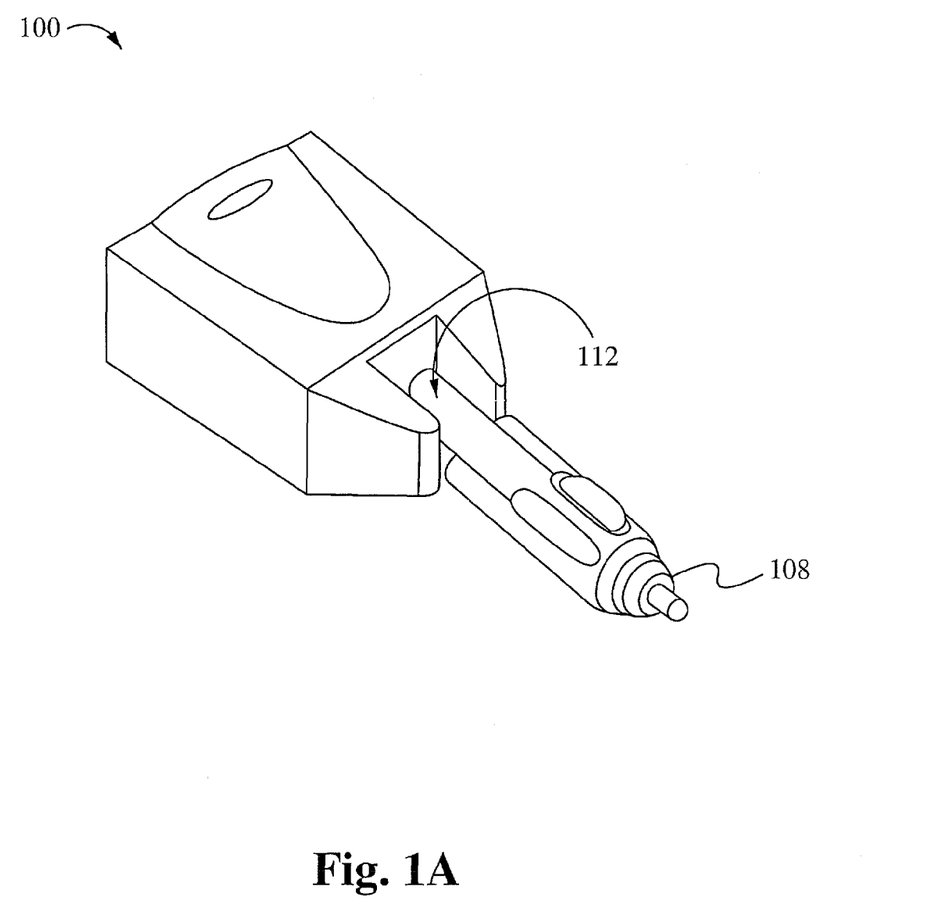
FIG. 1A illustrates an exemplary embodiment of a base unit in accordance with some embodiments.
Figure 1B:
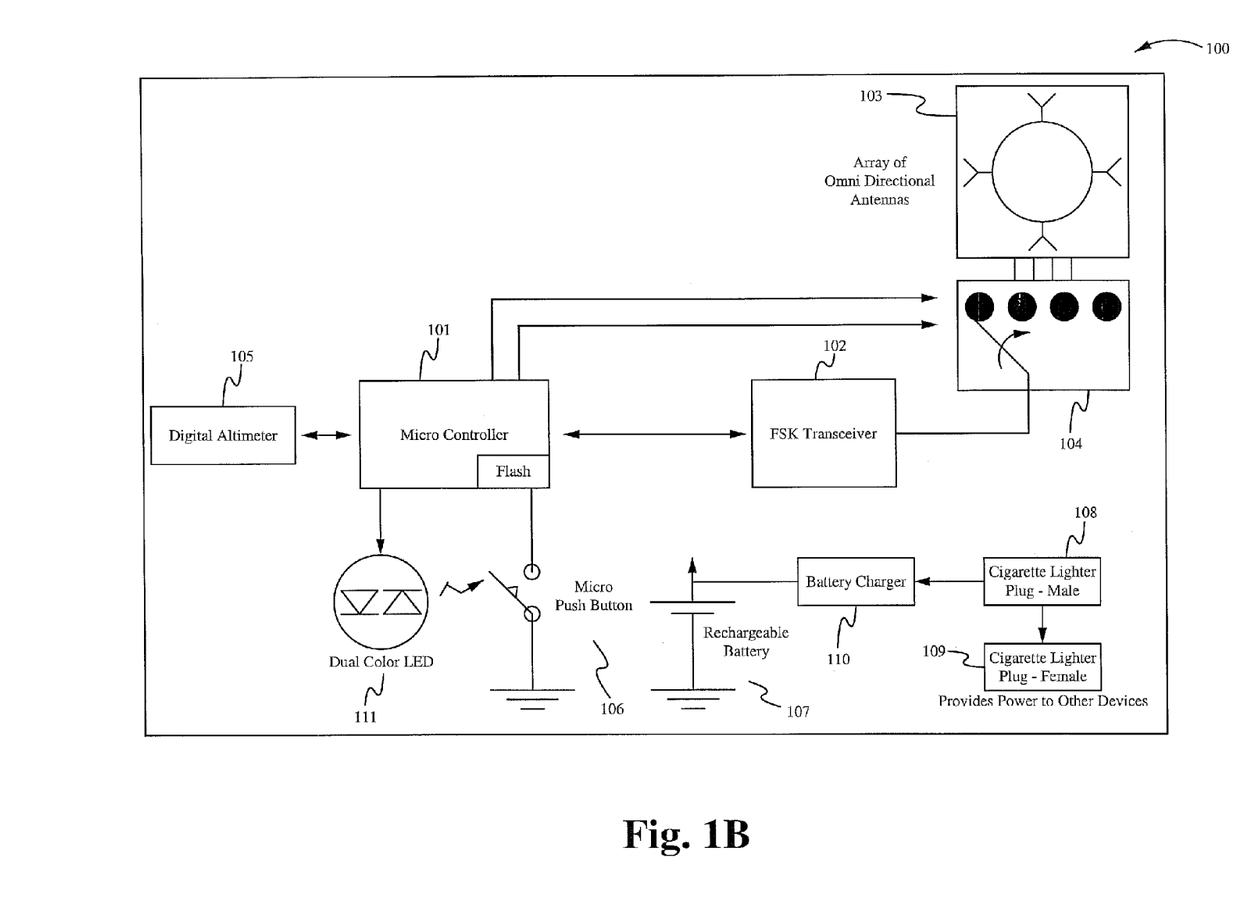
FIG. 1B illustrates a schematic view of the base unit in accordance with some embodiments.

While FIG. 1A illustrates an exemplary embodiment of a base unit 100 in accordance with some embodiments, FIG. 1B illustrates a schematic view of the base unit 100 in accordance with some embodiments. In some embodiments, the locator base unit 100 includes a micro-controller 101, a Frequency Shift Keying (FSK) transceiver 102, an array of omni-directional antennas 103, antenna switching circuitry 104, an altimeter 105, a pushbutton micro-switch 106, a dual-color LED (111) and rechargeable battery 107. Typically, the micro-controller 101 has memory, such as flash memory. In some embodiments, the base unit 100 has a cigarette lighter plug 108 that plugs into a car cigarette lighter socket 109 as a source of power and that charges its battery 107 through a battery charger 110. The base unit 100 is able to operate on its battery 107 as a source of power. In addition or alternatively, the base unit 100 has an outlet plug (not illustrated) that plugs into an electric outlet as a source of power.

In some embodiments, the base unit 100 has socket splitter 109 configured to allow another device to be charged while the base unit 100 is plugged into, for example, the car cigarette lighter socket. In some embodiments, the base unit 100 is able to swivel about a portion 112 of its power connector such that the base unit 100 can always be kept in vertical position or any other desired position.

In some embodiments, each omni-directional antenna 103 is a flat printed circuit antenna. Such planar antennas are advantageously light weight and are located within the base unit. Alternatively, the array of omni-direction antennas 103 is based on monopole antennas. The omni-directional antennas 103 allow the base unit to send a carrier wave from each antenna 103.

In some embodiments, the base unit 100 includes a GPS component (not illustrated).

In one application, the base unit is used in a vehicle such that a user is able to find the vehicle. In some embodiments, the base unit is built into the vehicle. In another embodiment, the base unit is plugged into a bay in a vehicle's dashboard.

In another application, the base unit is provided as part of a homing service. Particularly, the base unit is at an office building, a site, a school, an airport, a hospital, a library, a zoo, an amusement park, a shopping mall, within a city, etc., allowing for augmented geo-location services to help users find, for example, a specific room on a specific floor in a hospital.

In another similar application to the homing application, base units are installed at specific waypoints, allowing a specific route to be indicated for a user.

Figure 2A:
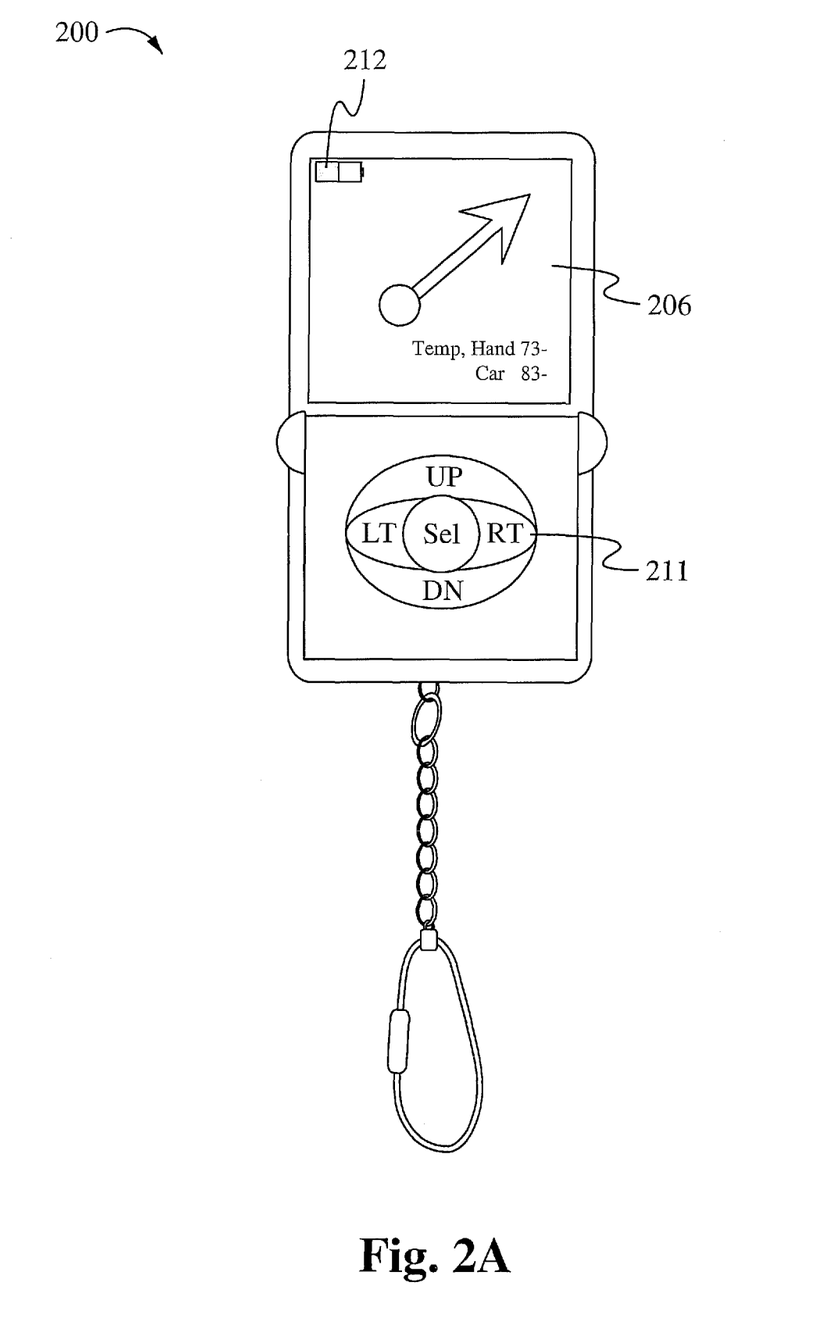
FIG. 2A illustrates an exemplary embodiment of a handheld unit in accordance with some embodiments.
Figure 2B:
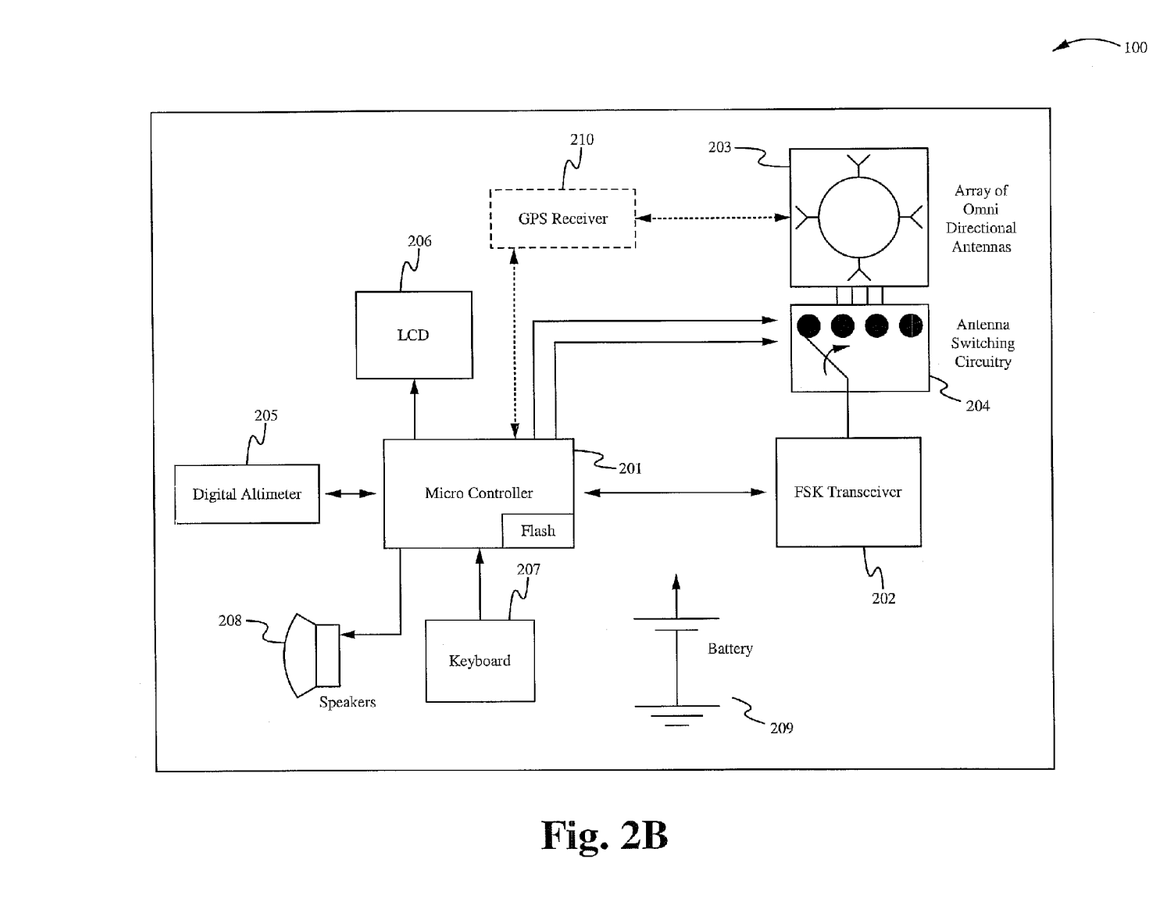
FIG. 2B illustrates a schematic view of the handheld unit in accordance with some embodiments.

While FIG. 2A illustrates an exemplary embodiment of a handheld unit 200 in accordance with some embodiments, FIG. 2B illustrates a schematic view of the handheld unit 200 in accordance with some embodiments. In some embodiments, the handheld unit 200 includes a micro-controller 201, an FSK transceiver 202, an array of omni-directional antennas 203, a antenna switching circuitry 204, an altimeter 205, a display 206, a keypad 207, speakers 208 and a battery 209. The micro-controller 201 has memory, such as flash memory. In some embodiments, the handheld unit 200 also includes a GPS unit 210. The handheld unit 200 is configured to operate without GPS but is able to use GPS to extend the range outdoors. The micro-controller 201 controls the handheld unit 200 and supports GPS operation.

The handheld unit 200 also includes a plurality of buttons 211. The plurality of buttons 211 includes up, down, right, left, select, and reset. With the up/down/right/left buttons, the user is able to browse a list of items and menus. It should be understood that navigation via buttons is only illustrative and that dials and the like can be used. The user is able to select a highlighted item via the select button. In some embodiments, the select button also powers on and off the handheld unit 200; particularly, the select button is pressed for a predetermined amount of time. Alternatively, a power button is provided that turns on and off the locator. The reset button resets the locator. The plurality of buttons 211 allows the user to configure the handheld unit 200 and perform pairing.

In some embodiments, the display 206 is an LCD. In some embodiments, the display 206 is a touchscreen display. In some embodiments, the display 206 is in color. In some embodiments, a battery indicator 212, in communication with the base unit indicator, or both are displayed.

In some embodiments, the keypad 207 is an on-screen keypad.

In some embodiments, each omni-directional antenna 203 is a flat printed circuit antenna within the handheld unit. Alternatively, the array of omni-direction antennas 203 is based on monopole antennas. The omni-directional antennas 203 serve as a bearing estimation mechanism.

In some embodiments, the handheld unit is a stand alone unit. Alternatively, the handheld unit is an add-on to or integrated into electronic devices such as cell phones, PDAs and other suitable devices. In some embodiments, the devices have networking capabilities and/or other means to download route information or other important information. For example, the devices include a USB port which allows for the transferring of information.

In some embodiments, a plurality of handheld units can be used in conjunction with a single base unit. Alternatively or in addition, a handheld unit can be used in conjunction with a plurality of base units. For example, a base unit located at Store 1 of a mall is able to provide information to handheld units. A customer having one of the handheld units in search of Store 2 within the mall is able to receive information from a base unit located at Store 2. Alternatively or in addition, handheld units can be configured to communicate between themselves and find bearing to each other.

Usage

Figure 3:
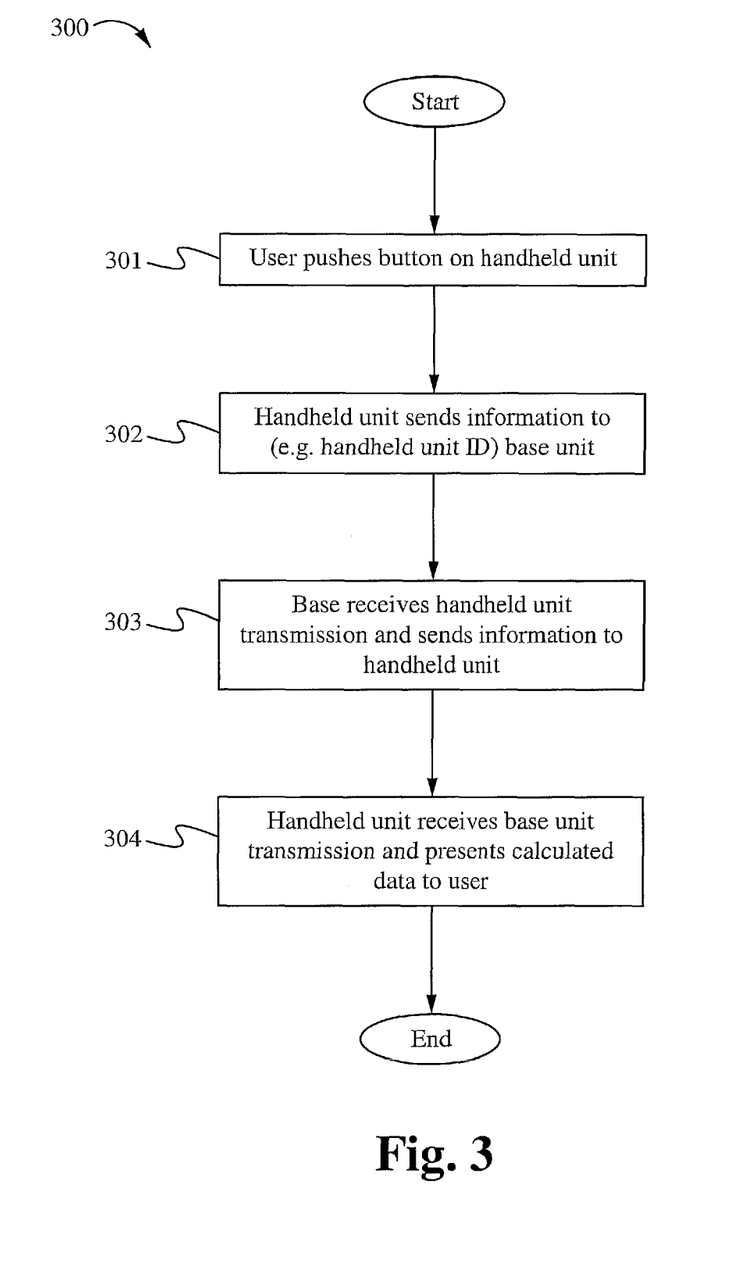
FIG. 3 illustrates an exemplary process of using the handheld unit in accordance with some embodiments.

FIG. 3 illustrates an exemplary process 300 of using the handheld unit 200 in accordance with some embodiments. Assume for purposes of illustration that the user wishes to find his vehicle and that the base unit 100 in the vehicle is powered on.

At step 301, the user activates the locator via a button on the handheld unit 200.

At step 302, the handheld unit 200 transmits its ID using a software protocol to contact the base unit 100. In some embodiments, the software protocol used is a narrow band transmission protocol, such as ZIGBEE, WiFi, Bluetooth, WiMax, or any suitable low rate FSK half-duplex communication on an ISM (Industrial, Scientific and Medical) radio band.

At step 303, the base unit 100 receives the handheld unit transmission. Upon a handheld unit ID match, the base unit 100 responds with the base unit ID, its altimeter reading, its bearing measurement sequence and its protocol (e.g. frequency and or band hopping). This reply sequence transmission repeats N times with an interval of T seconds. In some embodiments, the value of T is the default value prescribed by the respective protocol that is used. In some embodiments, the value of T is modified by programming by the user and/or is based on certain events, such as downloads and/or updates, location type determination, to fit specific needs.

At step 304, the handheld unit 200 receives the base unit transmission. Upon a base unit ID match, the handheld unit 200 calculates the bearing and presents it on the display 206. In some embodiments, the bearing is shown as a graphical arrow which is graphically filled proportionally to the received power as an indication of the distance from the base unit 100. The handheld unit 200 also calculates the height difference between the two units and graphically presents it on the display 206. The height difference can be calculated by several methods, alone or combined, such as from GPS, pressure difference (which can be adjusted/synchronized when leaving the car, during a pairing process or during production), etc.

In some embodiments, the handheld unit 200 beeps at a beep rate proportional to received power as an indication of the distance to the base unit 100. In other embodiments, the pitch of the beep varies proportional to the received power as an indication of the distance to the base unit 100. Alternatively or in addition, the distance is audibly presented to the user. The user is able to control the volume on the handheld device 200. For example, the user is able to silence the beeps by pressing a button or configuring the handheld unit 200 to disable the beeper for quiet operation. In some embodiments, the user is also able to set up preset sounds for the different information including, but not limited to, heading up, heading down, distance, incoming information, and back.

After step 304, the process 300 ends. As described above, a user input generates an interrupt to start the process 200. In some embodiments, a loop back (not illustrated) continuously and periodically monitors user input as needed.

System

Figure 6:
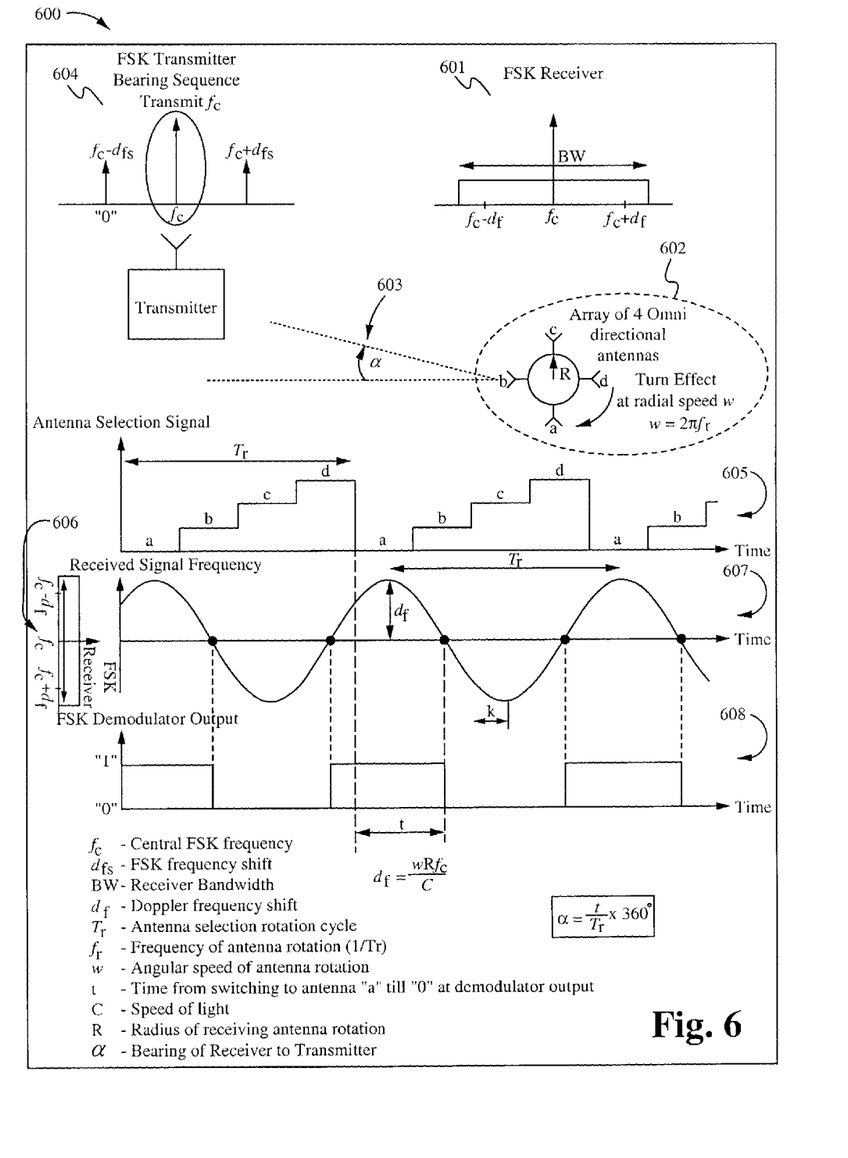
FIG. 6 illustrates an exemplary implementation of a Doppler based DF system using an FSK transmitter and an FSK receiver in accordance with some embodiments.

FIG. 6 illustrates an exemplary implementation of a Doppler based DF system 600 using an FSK transmitter 604 and an FSK receiver 601 in accordance with some embodiments. Assume the FSK transmitter 604 is the base unit 100 and the FSK receiver 601 is the handheld unit 200. As illustrated, an array of omni-directional antennas 602 is equi-angularly located on a perimeter of an imaginary circle, with bearing 603 indicated as α, is used. To simulate a mechanical rotating receiving antenna, such as the one described above, individual antennas of the array are switched in sequence as a simple phase array. In some embodiments, the array includes four omni-directional antennas. In some embodiments, each omni-directional antenna 602 is a flat printed circuit antenna within the handheld unit 200.

In some embodiments, instead of using an FM demodulator as in prior art locators, a dual tone FSK receiver/demodulator is used. While the FSK transmitter 604 sends the beacon signal used by the FSK receiver 601 to measure the bearing 603, the receiver parameters are defined so that its central frequency is $f_e$, and $f_e+d_f$ is interpreted as 1 while $f_e-d_f$ is interpreted as 0. The simulated rotation of the antenna then starts and causes a frequency shift at the receiver 601 of up to $\pm d_f$. The frequency shift caused by rotation is interpreted as a series of 1s and 0s at demodulator output, as shown by the signal 608. Signal 608 shows an exemplary output signal from the FSK demodulator. Signal 605 is an exemplary control signal of the antenna selector. As illustrated, antennas a, b, c, and d are switched in sequence. The phase difference between signals 605 and 608 is proportional to the bearing to the base unit. Signal frequency 607 describes the frequency at the receiver input over time; the 4-PSK signal received at the receiver input is translated to a frequency shift after filtering in the demodulator. The frequency increases when the receiver antenna moves closer to the transmitting antenna and the frequency decreases when the receiver antenna moves away to the transmitting antenna. The FSK demodulator frequency shift diagram 606 represents the demodulator circuitry. Specifically, the demodulator will yield "1" for received signal greater than $f_e$ and "0" for received signal lower than $f_e$.

Algorithm

As discussed above, when multipath situations occur, the Doppler based DF system, for example, suffers from bearing errors. To overcome the multipath phenomena, bearing to a base unit is computed over multiple transmitted carrier frequencies and transmitting antennas. The results are cyclicly averaged to yield an accurate result. The statistics of the bearing results for the various frequencies and transmitting antennas is then processed. The bearing results are cyclic averaged to yield an accurate bearing result. A specific bearing result can be omitted if it highly deviates from the cyclic average; the cyclic average will then be recalculated omitting this bearing result. The overall variance is calculated to assess the quality of the overall bearing result. A too high variance can be used to disqualify the bearing sequence; a new bearing sequence request will then be initiated. The term cyclic average is used to refer to the average on a circle; for example, the cyclic average of 340° and 20° is 0°.

A computed bearing is a value with a random variation that varies with frequency, multipath effects and transmitting antennas. Averaging computed bearings over multiple instances, preferably at multiple frequencies and transmitting antennas, statistically yields a more reliable computed bearing result. In most cases, the averaged bearing is the real direction to the transmitter.

Communication Layers and Protocol

PHYSICAL LAYER: Communication between the handheld unit 200 and base unit 100 enables multi base unit/handheld unit half-duplex communication. In the physical layer, communication uses dual tone FSK modulation. At least two frequency bands are supported: the 902-928 MHz band (for the US market) and the 868-870 MHz band (for the EU market). Other frequency bands that are supported include the 400 MHz band. The bit rate is typically 2400 bps. The transmit power level is set to satisfy safety and regulatory requirements including FCC and ETSI limitations (30 dBm). The communication mechanism implements a frequency hopping algorithm to fully comply with FCC and ETSI standards. Each unit has a unique burned-in address of 6 bytes length.

DATA LINK LAYER: The Data Link Layer is based on the Ethernet protocol (IEEE 802.3) with the following modifications. The Carrier-Sense Multiple Access/Collision Detection (CSMA/CD) protocol is modified to send data between a base unit and a handheld unit by first locating an idle channel based on a frequency hopping algorithm. The receiving unit or station then acknowledges (Ack) each frame reception. The transmitting unit or station repeats the frame transmission if an Ack was not received within X seconds up to Y times. In some embodiments, the value of X is two and the value of Y is three. As discussed above, such timing can be modified as needed or desired to improve performance.

Figure 7:
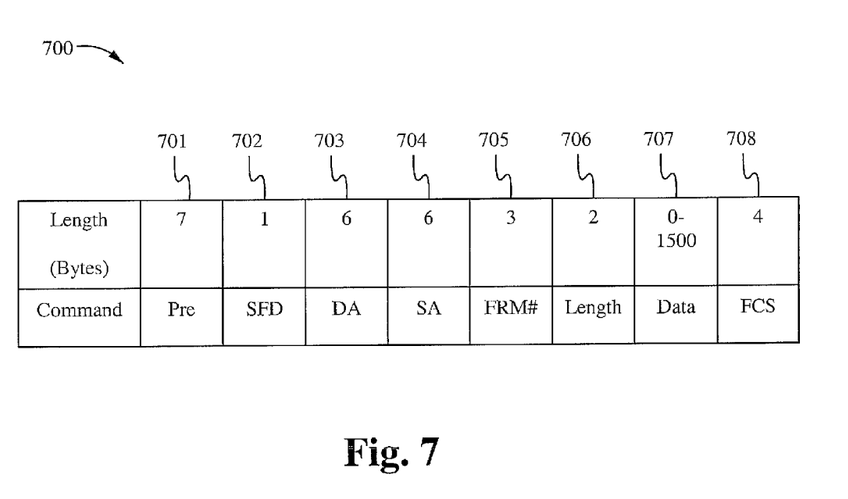
FIG. 7 illustrates an exemplary data link layer frame structure in accordance with some embodiments.

FIG. 7 illustrates an exemplary data link layer frame structure 700 in accordance with some embodiments.

The preamble (PRE) field 701 is 7 bytes. The PRE field is an alternating pattern of ones and zeros that tells receiving stations that a frame is coming and provides a means to synchronize the frame-reception portions of receiving physical layers with the incoming bit stream.

The start-of-frame delimiter (SFD) field 702 is 1 byte. The SFD field is typically a predetermined pattern of ones and zeros indicating that the next bit is the left-most bit in the left-most byte of the destination address.

The destination address (DA) field 703 is 6 bytes. The DA field identifies which station(s) should receive the frame.

The source address (SA) field 704 is 6 bytes. The SA field identifies the sending station.

The frame number (FRM#) field 705 is a 16-bit cyclic counter of the transmitted frame number.

The length (LENGTH) field 706 is 2 bytes. The LENGTH field indicates the number of data bytes that are contained in the data field of the frame.

The data (DATA) field 707 is a sequence of N bytes of any value, where $0 \leq N \leq 1500$.

The frame check sequence (FCS) field 708 is 4 bytes. The FCS contains a 32-bit cyclic redundancy check (CRC) value, which is created by the transmitting unit and is recalculated by the receiving unit to check for damaged frames.

As each frame is sent onto the shared channel(s), all receiving units look at the destination address. If the destination address of the frame matches with the interface address of a receiving unit, the frame is read entirely by that receiving unit and is delivered to the application layer. All other receiving units stop reading the frame when they discover that the destination address does not match their own interface address.

APPLICATION LAYER: All application layer commands, which include those listed in the following table, are sent at the data field of the data link layer.

| COMMAND | LENGTH (bytes) | HEADER (in ASCII) | DATA |
|---|---|---|---|
| Request location (HU to BU) | 3 | RLO | None |
| Location | 16 | LCT | Height (3 bytes), Bearing sequence (10 × real FF; where real FF is a series of sequential uncoded unifrequency signals) |
| Request for pairing | 9 | RFP | Sender address (6 bytes) |
| Pairing ACK | 9 | PAK | Sender address (6 bytes) |
| Request for software bootstrap (sent to unit to be loaded) | 7 | RSB | Number of packets that will be used (4 bytes) |
| ACK software sending | 3 | ASS | None |
| Software to load | 11 + length | STL | Start address (4 bytes), Length (4 bytes), Length × bytes of data |
| ACK frame reception | 5 | ACK | FRM# (2 bytes) |

In operation, a user pairs a handheld unit with a base unit before usually only once after purchase. The user can pair the units before leaving a parked vehicle, for example. The user typically executes the pairing when the handheld unit is outside the vehicle and the base unit is inside the vehicle. The pairing is able to be established even with the vehicle doors closed. Alternatively, the pairing can be done during manufacturing process. Pairing helps the handheld unit to determine the 0 distance signal strength and program a pairing ID into the units.

The user is able to locate the parked vehicle upon activating a button on the handheld unit. The handheld unit transmits information, including its handheld unit ID, to the base unit. Upon receiving the handheld unit transmission and a handheld unit ID match, the base unit responds to the handheld unit with its base unit ID and other data necessary for the handheld unit to determine the location of the base unit. Upon receiving the base unit transmission and a base unit ID match, directional information is presented on the handheld unit. As described above, directional information is visually and/or audibly presented to the user. The directional information guides the user to the parked vehicle, even in a multi-floor parking structure. The directional information is periodically updated on the handheld unit. Transmissions between the handheld unit and the base unit are FSK modulated and demodulated.

In some embodiments, the handheld unit advantageously uses flat printed circuit antennas located within the handheld unit instead of using a whip antenna. A whip antenna makes a handheld unit impractical for carrying around as the whip antenna contributes to the shape oddity of the handheld unit and is able to be broken off if the user is not careful. Furthermore, the handheld unit advantageously makes use of an existing FSK demodulator that is already on the circuit for controlling communication between the base unit and the handheld unit. As such, the size of the handheld unit is minimized since the handheld unit does not require or use an additional component—an FM demodulator. In addition, such frequency diversity and antenna diversity methods overcome the effect of fading caused by multipath.

The present invention has been described in terms of specific embodiments incorporating details to facilitate the understanding of principles of construction and operation of the invention. Such reference herein to specific embodiments and details thereof is not intended to limit the scope of the claims appended hereto. A person skilled in the art would appreciate that various modifications and revisions to system and method for locating items and places. Consequently, the claims should be broadly construed, consistent with the spirit and scope of the invention, and should not be limited to their exact, literal meaning.

What is claimed is:

1. A method of using a locator, the method comprising:
   a. transmitting a first set of information directly from a first unit to a second unit by using a narrow band transmission protocol;
   b. receiving the first unit transmission at the second unit;
   c. transmitting a second set of information from the second unit to the first unit if there is a first ID match in response to receiving the first unit transmission;
   d. receiving the second unit transmission at the first unit; and
   e. presenting data at the first unit to a user if there is a second ID match in response to receiving the second unit transmission, the data comprising a graphical arrow which indicates a calculated height difference between the first unit and the second unit, points toward the second unit regardless of the orientation of the first unit and is graphically filled proportionally to a received power as an indication of a distance between the first unit and the second unit.

2. The method of claim 1, wherein the second set of information is periodically transmitted.

3. The method of claim 1, wherein transmissions are FSK modulated and demodulated.

4. The method of claim 1, wherein the data further includes a bearing computed by the second unit.

5. The method of claim 4, wherein the bearing is calculated using Doppler effect based measurements.

6. The method of claim 4, wherein the bearing is a cyclic average of bearing results.

7. The method of claim 4, wherein the bearing is computed over multiple transmitted carrier frequencies and transmitting antennas.

8. The method of claim 1, wherein the calculated height difference is based on GPS.

9. The method of claim 1, wherein the calculated height difference is based on a pressure difference between the first unit and the second unit.

10. The method of claim 1, wherein the presenting includes the first unit beeping at a beep rate proportional to a received power as an indication of a distance between the first unit and the second unit.

11. The method of claim 1, wherein the presenting includes presenting different sounds for different information.

12. The method of claim 1, wherein the first unit is a handheld locator unit having a first set of planar antennas, and the second unit is the base locator unit having a second set of planar antennas.

13. A method of using a locator, the method comprising:
   a. transmitting a first set of information from a first unit to a second unit by using a narrow band transmission protocol;
   b. receiving the first unit transmission at the second unit;
   c. transmitting a second set of information from the second unit to the first unit upon a first ID match;
   d. receiving the second unit transmission at the first unit; and
   e. presenting data at the first unit to a user upon a second ID match, the data comprising directional information to the second unit;
wherein the data further includes a graphical arrow which indicates a calculated height difference between the first unit and the second unit, points toward the second unit regardless of the orientation of the first unit and is graphically filled proportionally to a received power as an indication of a distance between the first unit and the second unit, and further wherein the presenting includes the first unit beeping at a pitch that changes proportionally to a received power as an indication of a distance between the first unit and the second unit.

14. A method of overcoming multipath effects, the method comprising:
   a. computing at least one bearing to a first unit over multiple frequencies and transmitting antennas;
   b. processing statistics of bearing results;
   c. determining a cyclic average of the bearing results;
   d. calculating an overall variance;
   e. assessing quality of a computed bearing result based on the overall variance; and
   f. upon assessing, either displaying the computed bearing result on a second unit or disqualifying the computed bearing.

15. The method of claim 14, wherein a bearing result deviating from the cyclic average by a predetermined amount is removed before determining the cyclic average.

16. The method of claim 14, wherein the first unit is a base unit and the second unit is a handheld unit, wherein the base unit and the second unit are used to locate items and places.

17. The method of claim 14, wherein each of the first unit and the second unit includes a set of planar antennas.

18. The method of claim 14, wherein each of the first unit and the second unit includes an FSK transceiver.

19. A method of using a locator, the method comprising:
   a. transmitting a first set of information including a first destination address and a first source address directly from a first unit to a second unit by using a narrow band transmission protocol;
   b. receiving the first unit transmission at the second unit;
   c. transmitting a second set of information including a second destination address and a second source address from the second unit to the first unit if there is a first source address match in response to receiving the first unit transmission;
   d. receiving the second unit transmission at the first unit;
   e. presenting data at the first unit to a user if there is a second source address match in response to receiving the second unit transmission, the data comprising directional information to the second unit, the directional information a graphical arrow which indicates a calculated height difference between the first unit and the second unit, points toward the second unit regardless of the orientation of the first unit and is graphically filled proportionally to a received power independent of the orientation of the first unit as an indication of a distance between the first unit and the second unit, wherein presenting the data comprises the first unit beeping at a beep rate that changes proportionally to a received power as an indication of a distance between the first unit and the second unit; and
   f. always refraining from presenting the data at the first unit to the user in response to receiving the second unit transmission if the second source address match does not occur.

20. The method of claim 19 wherein the second set of information comprises an altimeter reading and a bearing measurement sequence.

21. The method of claim 20 wherein the bearing measurement sequence is cyclic averaged to yield an accurate bearing result.

22. The method of claim 19 wherein the data is always presented at the first unit to the user if there the second source address match.

* * * * *